US010904194B2

(12) United States Patent
Robinson et al.

(10) Patent No.: US 10,904,194 B2
(45) Date of Patent: Jan. 26, 2021

(54) DYNAMIC EMAIL CONTENT ENGINE

(71) Applicant: salesforce.com, inc., San Francisco, CA (US)

(72) Inventors: Bradley P. Robinson, San Francisco, CA (US); Brandon Young, San Francisco, CA (US); Arun Kamoji, San Francisco, CA (US); Samuel Parsons, San Francisco, CA (US); Ian Cruz, San Francisco, CA (US); Lydia Yang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 109 days.

(21) Appl. No.: 15/700,885

(22) Filed: Sep. 11, 2017

(65) Prior Publication Data

US 2019/0081920 A1    Mar. 14, 2019

(51) Int. Cl.
*H04L 12/58* (2006.01)

(52) U.S. Cl.
CPC .................................. *H04L 51/26* (2013.01)

(58) Field of Classification Search
CPC ........ G06Q 50/00; G06Q 50/01; G06Q 10/00; G06Q 30/02; G06Q 30/0207; G06Q 30/0241; G06Q 30/0243; G06Q 30/0269; G06Q 30/0271; G06Q 30/0251; H04L 51/26; G06F 16/24578; G06F 9/4881
See application file for complete search history.

(56) References Cited

U.S. PATENT DOCUMENTS

| | | | |
|---|---|---|---|
| 6,480,885 B1 | 11/2002 | Oliver | |
| 7,275,083 B1 | 9/2007 | Seibel et al. | |
| 7,831,676 B1 | 11/2010 | Nagar | |
| 8,738,611 B1 | 5/2014 | Zarmer et al. | |

(Continued)

FOREIGN PATENT DOCUMENTS

| | | |
|---|---|---|
| JP | 2016-29570 A | 3/2016 |
| WO | WO 2001/086545 A2 | 11/2001 |

OTHER PUBLICATIONS

Srivastava et al, "Personalization of Automatic E-mail Response for the University System", Srivastava et al., Jan. 2013 DOI: 1049/cp.2013.2362, Confluence 2013: The Next Generation Information Technology Summit (4th International Conference), 5 pages.

(Continued)

*Primary Examiner* — Lance Leonard Barry
(74) *Attorney, Agent, or Firm* — Sterne, Kessler, Goldstein & Fox P.L.L.C.

(57) ABSTRACT

Disclosed herein are system, method, and computer program product embodiments for assigning a content item to a subscriber record. Embodiments include electing a subscriber record from a database and assigning a persona record to the selected subscriber record. Then, a first and a second content item are added to a content pool based on a first and a second rule, respectively, where the first and the second rule are applied based on the persona record. Embodiments also include ranking the first content item and the second content item based on a first priority value and a second priority value associated with the first and the second rule, respectively. Then, the first content item is assigned to the subscriber record based on the ranking.

20 Claims, 7 Drawing Sheets

(56) References Cited

U.S. PATENT DOCUMENTS

| | | |
|---|---|---|
| 9,256,695 B1 | 2/2016 | Willis et al. |
| 2002/0023093 A1 | 2/2002 | Ziff et al. |
| 2002/0188497 A1 | 12/2002 | Cerwin |
| 2004/0153466 A1 | 8/2004 | Ziff et al. |
| 2004/0153512 A1 | 8/2004 | Friend |
| 2005/0015333 A1 | 1/2005 | Schwerin-Wenzel et al. |
| 2006/0004869 A1 | 1/2006 | Yuster et al. |
| 2006/0041443 A1 | 2/2006 | Horvath, Jr. |
| 2006/0074727 A1 | 4/2006 | Briere |
| 2006/0168059 A1 | 7/2006 | Chang et al. |
| 2006/0218111 A1 | 9/2006 | Cohen |
| 2007/0083425 A1 | 4/2007 | Consineau et al. |
| 2007/0244895 A1 | 10/2007 | Mohler et al. |
| 2007/0244901 A1 | 10/2007 | Mohler et al. |
| 2008/0028021 A1 | 1/2008 | Roberts et al. |
| 2008/0091511 A1 | 4/2008 | Monin et al. |
| 2008/0126951 A1 | 5/2008 | Sood et al. |
| 2009/0100099 A1 | 4/2009 | Buckwalter |
| 2009/0132490 A1 | 5/2009 | Okraglik |
| 2011/0178962 A1 | 7/2011 | Sood |
| 2012/0059906 A1 | 3/2012 | Ciancio-Bunch et al. |
| 2012/0089610 A1 | 4/2012 | Agrawal et al. |
| 2012/0150888 A1 | 6/2012 | Hyatt et al. |
| 2012/0191546 A1* | 7/2012 | Phelan ............... G06Q 30/0269 705/14.67 |
| 2013/0002676 A1 | 1/2013 | Ziemann |
| 2013/0139069 A1 | 5/2013 | Ciancio-Bunch |
| 2013/0282477 A1 | 10/2013 | Gould et al. |
| 2014/0025693 A1 | 1/2014 | Arora et al. |
| 2014/0173012 A1 | 6/2014 | Ciancio-Bunch et al. |
| 2014/0257987 A1 | 9/2014 | Belanger et al. |
| 2014/0280624 A1 | 9/2014 | Dillingham et al. |
| 2014/0297366 A1 | 10/2014 | McGreal |
| 2015/0012467 A1* | 1/2015 | Greystoke ............. G06N 20/00 706/12 |
| 2015/0032824 A1 | 1/2015 | Ankesh et al. |
| 2015/0100604 A1 | 4/2015 | Ciancio-Bunch et al. |
| 2015/0100894 A1 | 4/2015 | Ankesh et al. |
| 2015/0127711 A1* | 5/2015 | Livingston .............. H04L 67/10 709/202 |
| 2015/0256499 A1 | 9/2015 | Kumar et al. |
| 2015/0295871 A1 | 10/2015 | Blanca et al. |
| 2015/0332340 A1* | 11/2015 | Brown .................. G06Q 30/02 705/14.66 |
| 2015/0341300 A1 | 11/2015 | Swain et al. |
| 2015/0347924 A1 | 12/2015 | Zeng et al. |
| 2016/0034588 A1 | 2/2016 | Hyatt et al. |
| 2016/0078455 A1 | 3/2016 | O'Donnell et al. |
| 2016/0098745 A1 | 4/2016 | Adams et al. |
| 2016/0267167 A1* | 9/2016 | Finn ..................... G06Q 10/04 |
| 2016/0321678 A1 | 11/2016 | Wong |
| 2017/0103471 A1 | 4/2017 | Kemp |
| 2017/0124596 A1* | 5/2017 | Wang ................. G06Q 30/0267 |
| 2017/0161372 A1 | 6/2017 | Fernández et al. |
| 2019/0073213 A1 | 3/2019 | Dong et al. |
| 2019/0080358 A1 | 3/2019 | Robinson et al. |
| 2019/0081920 A1 | 3/2019 | Robinson et al. |
| 2019/0258949 A1 | 8/2019 | Reyes et al. |
| 2019/0362289 A1 | 11/2019 | Rogynskyy et al. |

OTHER PUBLICATIONS

Mezö et al., "Distributed Mailing System", 2011 IEEE 17th International Symposium for Design and Technology in Electronic Packaging (SIITME), 6 pages.

Guo et al., "Design and Implementation of Data Management Center Based on Web Services", Guo et al., 2009 Ninth International Conference on Hybrid Intelligent Systems, DOI 10.1109/HIS.2009.177, 5 pages.

\* cited by examiner

DYNAMIC EMAIL CONTENT ENGINE

CROSS REFERENCE TO RELATED APPLICATIONS

This application is related to co-pending U.S. patent application Ser. No. 15/700,898, filed Sep. 11, 2017, entitled "Dynamic Email System,", which is incorporated herein by reference in its entirety.

BACKGROUND

A business often maintains overlapping email addresses across different departments. For example, a subscriber's email address may be simultaneously stored in a sales department and a service department. This creates a situation where subscriber segments collide. This may prevent the business from presenting multiple product marketing messages to an individual subscriber. This is often because an email system is prevented from sending multiple email messages to the same subscriber during a given time period (e.g., the email system may only send two entails per month per email address). This may cause inconsistent and unpredictable send volumes for the different departments.

In addition, this may prevent the business from creating email campaigns that cross sell products and services. For example, the business may want to create an email campaign that markets a product selected by the sales department, and cross sells a service package for that product from the service department. Finally, the business may need to create and send emails manually, especially when the business is restricted from sending additional emails to a subscriber during a given time period. This may require creating and storing different email templates, and manually assigning content from the different departments to an email. This is often tedious, error prone, and computationally intensive.

Thus, what is needed is a dynamic email system that automatically assigns relevant content to an email message for a subscriber that is present in different departments.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digits) of a reference number identifies the drawing in which the reference number first appears.

DETAILED DESCRIPTION

Provided herein are system, apparatus, device, method and/or computer program product embodiments, and/or combinations and sub-combinations thereof, for automatically assigning relevant content to an email for a subscriber at the time the email is sent. Further provided herein are system, apparatus, device, method and/or computer program product embodiments, and/or combinations and sub-combinations thereof, for a content engine that automatically assigning relevant content to an email for a subscriber based on a set of content rules and a persona assigned to the subscriber.

Figure 1:
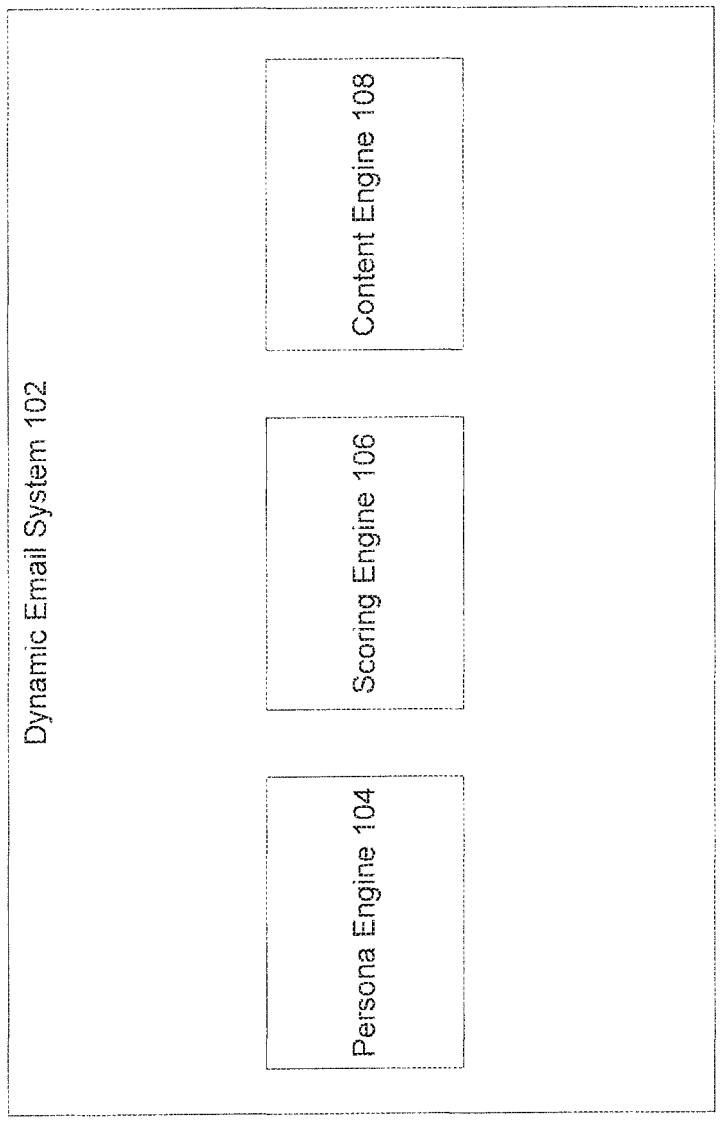
FIG. 1 is a block diagram of a dynamic email system, according to some embodiments.

FIG. 1 is a block diagram of a dynamic email system 102, according to some embodiments. Dynamic email system 102 includes persona engine 104, scoring engine 106, and content engine 108.

In some embodiments, persona engine 104 may assign a persona record to a subscriber record. This may correspond to 705 and 710 in FIG. 7 (discussed below). As would be appreciated by a person of ordinary skill in the art, a subscriber record may represent a prospect, a customer, or some other type of entity. A subscriber record may include, but is not limited to, a subscriber email address field, an account identifier field, a name field, an account type field, a content score field, a job function field, and a product interest field. Dynamic email system 102 may store a subscriber record in a subscriber record table in a database. As would be appreciated by a person of ordinary skill in the art, the database may be a relational database management system (DBMS).

In some embodiments, dynamic email system 102 may store a persona record in a persona record table in the database. As would be appreciated by a person of ordinary skill in the art, a persona record may represent a subscriber associated with a sales department, a marketing department, an information technology (IT) department, or various other type of department.

In some embodiments, persona engine 104 may select one or more subscriber records from a set of subscriber records for persona record assignment based on a suppression list. In some embodiments, persona engine 104 may skip assignment of a persona record to a subscriber record based on the associated subscriber being present in the suppression list. In some embodiments, the suppression list may include one or more subscribers to which emails have previously been sent.

In some embodiments, persona engine 104 may assign a persona record to a subscriber record based on the subscriber record being associated with either a prospect or a customer. In some embodiments, persona engine 104 may determine whether the subscriber record is associated with a prospect or a customer based on an account type field in the subscriber record.

In some embodiments, where the subscriber record is associated with a prospect, persona engine 104 may determine that the product interest field of the subscriber record is populated. Persona engine 104 may then assign a persona record to the subscriber record based on the product interest field. In some embodiments, where the product interest field is not populated in the subscriber record, persona engine 104 may assign a default persona record to the subscriber record. For example, in some embodiments, persona engine 104 may assign a sales persona record to the subscriber record.

In some other embodiments, where the subscriber record is associated with a customer, persona engine 104 may determine that the subscriber record indicates that the associated customer owns a sales cloud product. Persona engine 104 then determines whether the job function field of the subscriber record maps to a sales focused role. In some embodiments, where the job function field of the subscriber record maps to a sales focused role, persona engine 104 assigns a cross sales persona record to the subscriber record. In some other embodiments, where the job function field of the subscriber record does not map to a sales focused role, persona engine 104 determines whether the subscriber record has an associated propensity to buy (PTB) score.

As would be appreciated by a person of ordinary skill in the art, dynamic email system 102 may track one or more PTB scores for a subscriber record. For example, in some embodiments, dynamic email system 102 may track a product that the subscriber associated with the subscriber record has a propensity to buy. Dynamic email system 102 may then assign a PTB score to the product for the subscriber record. Dynamic email system 102 may store the PTB score in a unsorted staging stable associated with the subscriber record.

In some embodiments, dynamic email system 102 may rank the PTB scores stored in the unsorted staging table for a subscriber record. In some embodiments, persona engine 104 may assign a persona record to the subscriber record based on the persona record being associated with a product having a highest PTB score for the subscriber record. In some embodiments, where there is a tie among PTB scores, persona engine 104 may assign a persona record to the subscriber record based on a hierarchy of products which have a PTB score assigned.

In some other embodiments, persona engine 104 assigns a persona record to the subscriber record based on the subscriber record indicating that the associated customer does not own a sales cloud product. Persona engine 104 then determines whether the product interest field of the subscriber record does not map to a product that the associated subscriber owns. Persona engine 104 then assigns a persona record to the subscriber record based on the product interest field.

In some other embodiments, where the product interest field of the subscriber record does map to a product that the associated subscriber owns, persona engine 104 determines whether a job function field of the subscriber record does not map to a product that the associated subscriber owns. Persona engine 104 then assigns a persona record to the subscriber record based on the job function field.

In some other embodiments, where the product interest field of the subscriber record does map to a product that the associated subscriber owns, and the job function field of the subscriber record does map to a product that the associated subscriber owns, persona engine 104 determines whether there are any products that the subscriber associated with the subscriber record does not own. In some embodiments, if there are products that the subscriber associated with the subscriber record does not own, persona engine 104 assigns a persona record to the subscriber record based on a product hierarchy. For example, persona engine 104 assigns a persona record to the subscriber record based on a product with a highest revenue potential. In some other embodiments, if there are no products that the subscriber associated with the subscriber record does not own, persona engine 104 assigns a default persona record to the subscriber record. For example, persona engine 104 may assign a sales persona record to the subscriber record.

In some embodiments, scoring engine 106 may assign a content score to a content item in a content database. In some embodiments, scoring engine 106 may determine the performance of a content item across different email messages. For example, in some embodiments, scoring engine 106 may determine the cumulative performance of a content item across multiple email messages by evaluating associated subscriber engagement data according to a series of rules.

In some embodiments, a content item may be an offer item (e.g., a proposal to a customer to buy a product or service). The content item may be stored in a content database. As would be appreciated by a person of ordinary skill in the art, the content database may be a relational DBMS.

In some embodiments, scoring engine 106 may assign a content score to a content items based on subscriber engagement data (e.g., click to open rate (CTOR), click rate, open rate, unsubscribe rate, etc.) associated with the content item. As would be appreciated by a person of ordinary skill in the art, scoring engine 106 may assign a content score at periodic intervals, during a maintenance automation, or at various other times. Similarly, as would be appreciated by a person of ordinary skill in the art, scoring engine 106 may recalculate a content score at periodic intervals, during a maintenance automation, or at various other times.

In some embodiments, scoring engine 106 may determine whether a content item in the content database has more than a threshold value of email sends. For example, scoring engine 106 may determine whether a content item in the content database has been sent more than 1000 times. In some embodiments, scoring engine 106 may assign a content score to a content item that has more than a threshold value of email sends. As would be appreciated by a person of ordinary skill in the art, the assignment of a content score to a content item having a threshold value of email sends may ensure that there is a sufficient sample size for ranking the content item among other content items.

In some embodiments, scoring engine 106 may calculate one or more content score metrics for a content item based on various criteria. For example, in some embodiments, scoring engine 106 may calculate a content score metric for a content item based on a CTOR, click rate, open rate, or unsubscribe rate metric.

In some embodiments, scoring engine 106 may rank a content item based on a content score metric. For example, in some embodiments, scoring engine 106 may compare a content score metric for a first content item to a content score metric for a second content item. In some embodiments, based on the difference in content score metrics, the first content item and the second content item may be reranked. In some embodiments, scoring engine 106 may only rank the first content item and the second content item differently, incrementing one rank from high to low where the difference between their content score metrics is statistically significant. As would be appreciated by a person of ordinary skill in the art, scoring engine 106 may determine that there is a statistically significant difference based on calculating a Z score between the first content score metric and the second content score metric. Moreover, as would be appreciated by a person of ordinary skill in the art, scoring engine 106 may rank the content items using various sorting mechanisms.

In some embodiments, scoring engine 106 may further rank a content item based on its content score for a second metric (e.g., click rate). As would be appreciated by a person of ordinary skill in the art, scoring engine 106 may rank content items based on a hierarchy of best performing content score metrics. As would be appreciated by a person of ordinary skill in the art, a user may specify the hierarchy of best performing content score metrics.

In some embodiments, scoring engine 106 may rank content score metrics of content items in reverse by counting the total number of content items being ranked. For example, in some embodiments, the total number of content items may be the top score.

In some embodiments, scoring engine 106 may weigh multiple content score metrics associated with a content item. In some embodiments, scoring engine 106 may multiply the multiple content score metrics associated with the content item by different weights. For example, scoring engine 106 may multiple a CTOR content score metric by a first weight and a click content score metric by a second weight.

In some embodiments, scoring engine 106 may normalize the multiple weighted content score metrics for the content item. In some embodiments, scoring engine 106 may sum the weighted content score metrics and normalize the resulting number so that it falls within a specific range. For example, in some embodiments, scoring engine 106 may normalize the resulting number to fall between 98 and 0, with 98 being the highest score and 0 being the lowest score. In some embodiments, scoring engine 106 may reserve a specific score in the normalized score range (e.g., a highest score for forced content). For example, scoring engine 106 may reserve a score of 99 for forced content.

In some embodiments, scoring engine 106 may evaluate content score metrics on a daily basis. In some other embodiments, scoring engine 106 may evaluate content score metrics on a different timeline. In some embodiments, scoring engine 106 may store the resulting normalized content score with its associated content item in the content database.

In some embodiments, content engine 108 assigns a content item to a subscriber record based on a content score associated with the content item, a persona record assigned to the subscriber record, or one or more characteristics of the content item. Dynamic email system 102, and content engine 108, solve the technical problem of having to manually assign content items for each email generation request from a different part of a business (e.g., different department). In addition, content engine 108 reduces the amount of database requests issued as part of the content assignment process. In particular, in some embodiments, content engine 108 assigns all content items to a subscriber record at one time, and prior to generation of an email based on the content item assignment. In contrast, previous approaches issued multiple database requests at the time of email sending, one for checking for each content item that could possibly be inserted into the email. Content engine 108 reduces these database requests, and therefore reduces computation. This computation reduction further increases the amount of emails that can be sent per unit of time. Finally, content engine 108 reduces storage requirements because only a single email template is needed for insertion of content items. In contrast, previous approaches required maintaining different email templates for use by different parts of the business. In addition to requiring different email templates, each content item may need to be stored in an offer 1 and offer 2 form in a marketing cloud computing system. This increased storage requirements and added complexity. Content engine 108 reduces these storage requirements.

Figure 2:
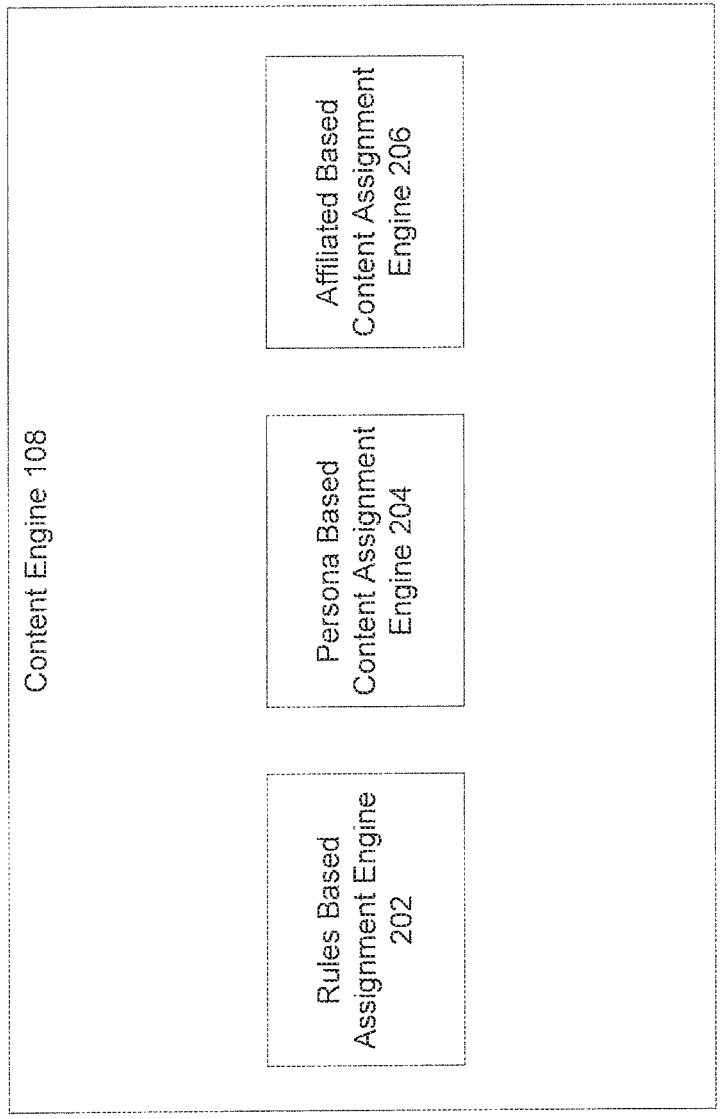
FIG. 2 is a block diagram of a content engine that assigns a content item to a subscriber record, according to some embodiments.

FIG. 2 is a block diagram of content engine 108, according to some embodiments. Content engine 108 includes rules based content assignment engine 202, persona based content assignment engine 204, and affiliated based content assignment engine 206.

In some embodiments, content engine 108 may assign multiple content items to a subscriber record. For example, content engine 108 may assign a first content item (e.g., a main offer), a second content item (e.g., a secondary offer), and a third content item (e.g., an offer for customers only). In some embodiments, content engine 108 may assign different content items based on one or more of a content score associated with the content item, a persona record assigned to the subscriber record, and one or more characteristics of the content item.

In some embodiments, content engine 108 may select a subset of content items in a content database for possible assignment to a subscriber record. In some embodiments, content engine 108 may store the subset of content items in a content pool. In some embodiments, a content pool may include content items from the content database that are eligible for assignment to a subscriber record.

In some embodiments, content engine 108 may select non-viewed content items in the content database for possible assignment to a subscriber record. For example, in some embodiments, content engine 108 may store in the content pool only content items that the subscriber associated with the subscriber record has not viewed in a certain period of time (e.g., the last 90 days). In other words, content engine 108 may only store "fresh" content items in the content pool. As would be appreciated by a person of ordinary skill in the art, content engine 108 may track a number of views of a content item in the content database by subscriber record.

In some embodiments, content engine 108 may select only valid content items in a content database for possible assignment to a subscriber record. In some embodiments, content engine 108 may select only valid content items from the non-viewed content items for possible assignment to the subscriber record. In some embodiments, content engine 108 may store content items marked as "live" in the content pool (e.g., non-expired content items). In some embodiments, content engine 108 may check an expiration date field of a content item to determine if the content item is expired.

In some embodiments, content engine 108 may assign a first content item to a subscriber record based on one or more of a content score associated with the content item, a persona record assigned to the subscriber record, and one or more characteristics of the content item. In some embodiments, content engine 108 may assign the first content item to a subscriber record using rules based content assignment engine 202 and or persona record based content assignment engine 204. In some embodiments, content engine 108 may assign all content items selected by rules based content assignment engine 202 and persona record based content assignment engine 204 to the content pool. Content engine 108 may then rank the content items in the content pool based on one or more priority values and content scores.

In some embodiments, rules based content assignment engine 202 may store content items in the content pool for possible assignment as a first content item to a subscriber record based on a series of rules. In some embodiments, rules based content assignment engine 202 may apply the series of rules in a prioritized order. In some embodiments, rules based content assignment engine 202 may store a content item with a priority value based on a rule in the series of rules that triggered storage of the content item in the content pool.

For example, in some embodiments, rules based content assignment engine 202 may apply the following series of rules. In some embodiments, rules based content assignment engine 202 may store a content item in the content pool based on the content item being forced content (e.g., having a force content flag="true"). Rules based content assignment engine 202 may add the content item to the content pool along with a first priority value.

In some embodiments, rules based content assignment engine 202 may store content items in the content pool based on the persona record assigned to the subscriber record being a cross sales persona record. Rules based content assignment engine 202 may add the content items to the content pool along with corresponding second priority values.

In some embodiments, rules based content assignment engine 202 may store a content item in a content pool based on the persona record assigned to the subscriber record having its product owned field set to true, and the content item having its upsell flag set to true. Rules based content assignment engine 202 may add the content item to the content pool along with a priority value associated with the particular persona record.

In some embodiments, rules based content assignment engine 202 may store a content item in a content pool based on the PTB content flag of the content item being not null. Rules based content assignment engine 202 may then add the content item to the content pool along with a corresponding fourth priority value based the PTB score.

In some embodiments, persona based content assignment engine 204 may apply a another set of rules. In some embodiments, persona based content assignment engine 204 may apply the another set of rules after rules based content assignment engine 202 completes. One or more of the following examples may correspond to 715 and 720 in FIG. 7 (discussed below). In some embodiments, persona based content assignment engine 204 may store one or more content items in the content pool based on the persona record assigned to the subscriber record, and the one or more content items having an age less than or equal to a threshold value (e.g., 30 days old). Persona based content assignment engine 204 may add the one or more content items to the content pool along with corresponding fifth priority values.

In some embodiments, persona based content assignment engine 204 may store one or more content items in the content pool based on the persona record assigned to the subscriber record, and the one or more content items having content scores greater than a threshold value (e.g., top 3 performance scores). Persona based content assignment engine 204 may add the one or more content items to the content pool along with corresponding sixth priority values.

In some embodiments, rules based content assignment engine 202 may store one or more content items in the content pool based on the persona record assigned to the subscriber record, and the job function field of the subscriber record. Persona based content assignment engine 204 may add the one or more content items to the content pool along with corresponding seventh priority values.

In some embodiments, content engine 106 may sort the content items in the content pool based on the assigned priority values and content performance scores. In some embodiments, content engine 106 may assign the highest ranked content item in the content pool to the subscriber record as its first content item (e.g., main offer). This may correspond to 725 and 730 in FIG. 7 (discussed below).

In some embodiments, content engine 108 may assign a second content item to a subscriber record based on one or more of a content score associated with the content item, a persona record assigned to the subscriber record, and one or more characteristics of the content item. In some embodiments, affiliated content based content assignment engine 206 of content engine 108 may assign a second content item to a subscriber record. In some embodiments, content engine 108 may assign all content items selected by the affiliated content based content assignment engine 206 to the content pool. Content engine 108 may then rank the content items in the content pool based on one or more priority values and content scores.

In some embodiments, content engine 108 may remove the assigned first content item stored in the content pool unless one or more rules apply. In some embodiments, content engine 108 may remove content items from the content pool that were assigned by rules based content assignment engine 202.

In some embodiments, content engine 108 may determine that the first content offer (e.g., the main offer) is not forced content (e.g., does not have a forced content flag of "true"). Content engine 108 may then remove content items from the content pool that match the persona record assigned to the subscriber record. In some embodiments, content engine 108 may remove content items from the content pool that match the persona record assigned to the subscriber record. In some embodiments, content engine 108 may store one or more content items in the content pool based on the persona record assigned to the subscriber record being a cross sales persona record. In some embodiments, content engine 108 may add the content items to the content pool along with corresponding second priority values.

In some other embodiments, content engine 108 may determine that the first content offer (e.g., the main offer) has a forced content of "true." Affiliated content based content assignment engine 206 may then assign one or more content items to the content pool based on their affiliation with the assigned first content item. For example, this may occur if there is no content item marked as forced content. In some embodiments, content engine 108 may add the one or more content items to the content pool along with corresponding first priority values.

In some embodiments, affiliated content based content assignment engine 206 may add additional content items based on a set of rules. For example, in some embodiments, affiliated content based content assignment engine 206 may store one or more content items in the content pool based on being affiliated content with the first content item, and the one or more content items having an age less than or equal to a threshold value (e.g., 30 days old). Affiliated content based content assignment engine 206 may add the one or more content items to the content pool along with corresponding third priority values.

In some embodiments, affiliated content based content assignment engine 206 may store one or more content items in the content pool based on being affiliated content with the first assigned content item, and the one or more content items having content scores greater than a threshold value (e.g., top 3 performance scores). Affiliated content based content assignment engine 206 may add the one or more content items to the content pool along with a fourth priority value.

In some embodiments, affiliated content based content assignment engine 206 may store one or more content items in the content pool based on being affiliated content with the first assigned content item, and the job function field of the subscriber record. Affiliated content based content assignment engine 206 may add the one or more content items to the content pool along with a fifth priority value.

In some embodiments, content engine 106 may sort the content items in the content pool based on their assigned priority values and content performance scores. In some embodiments, content engine 106 may assign the highest ranked content item in the content pool to the subscriber record as a second content item (e.g., affiliated offer).

In some embodiments, content engine 108 may assign a third content item to a subscriber record based on the subscriber record being associated with a customer. In some embodiments, content engine 108 may assign a content item from the content pool based on the content item being tagged as a third content item (e.g., a third offer). In some embodiments, content engine 108 may perform this assignment randomly.

In some embodiments, content engine 108 may determine that the first assigned content item or second assigned content item are available for selection. In some embodiments, content engine 108 may not insert the first and second content items into an email message for the subscriber record if they are unavailable.

In some embodiments, dynamic email system 102 may send an email for each subscriber record containing its associated assigned content items (e.g., a main offer, an affiliated offer, and third offer). As would be appreciated by a person of ordinary skill in the art, dynamic email system 102 may send the emails on demand or at various intervals.

In some embodiments, dynamic email system 102 may generate the email for each subscriber record using an email template. In some embodiments, dynamic email system 102 may insert all assigned content items into the email at once based on a single request for all assignments. This may reduce the number of network requests need to retrieve content items compared to previous solutions.

Figure 3:
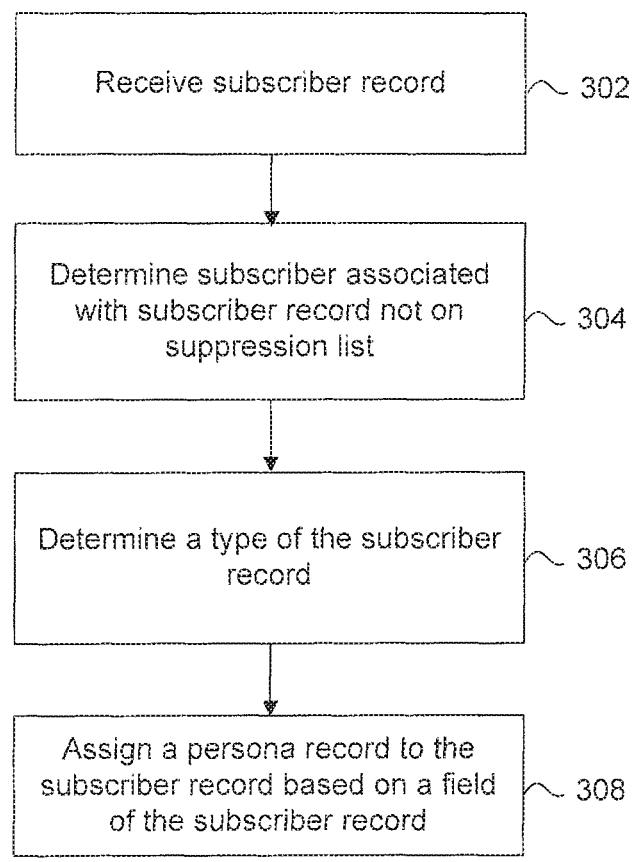
FIG. 3 is a flowchart illustrating a process for assigning a persona record to a subscriber record, according to some embodiments.

FIG. 3 is a flowchart for a method 300 for assigning a persona record to a subscriber record, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, persona engine 104 receives a subscriber record. As would be appreciated by a person of ordinary skill in the art, a subscriber record may represent a prospect, a customer, or some other type of entity. A subscriber record may include various fields including, but not limited to, a subscriber email address, account identifier, name, account type, content score, job function, and primary product interest field.

In 304, persona engine 104 determines that the subscriber associated with the subscriber record is not present on a suppression list. For example, persona engine 104 may determine that the email address of the subscriber record is not present on the suppression list.

In 306, persona engine 104 determines that the subscriber associated with the subscriber record is a given type (e.g., a customer or prospect). For example, in some embodiments, persona engine 104 may determine that the subscriber associated with the subscriber record is a customer based on an account type field of the subscriber record.

In 308, persona engine 104 assigns a persona record to the subscriber record based on one or more fields of the subscriber record, e.g., a primary product interest field and a job function field, or a product owned by subscriber record. For example, in some embodiments, where the product interest field is populated in the subscriber record, persona engine 104 may assign a persona record to the subscriber record based on the primary product interest field. In some other embodiments, where the job function field of the subscriber record maps to a sales focused role, persona engine 104 may assign a cross sales persona record to the subscriber record. In some other embodiments, where the job function field of the subscriber record does not map to a sales focused role, persona engine 104 may assign a persona record to the subscriber record based on an associated PTB score.

Figure 4:
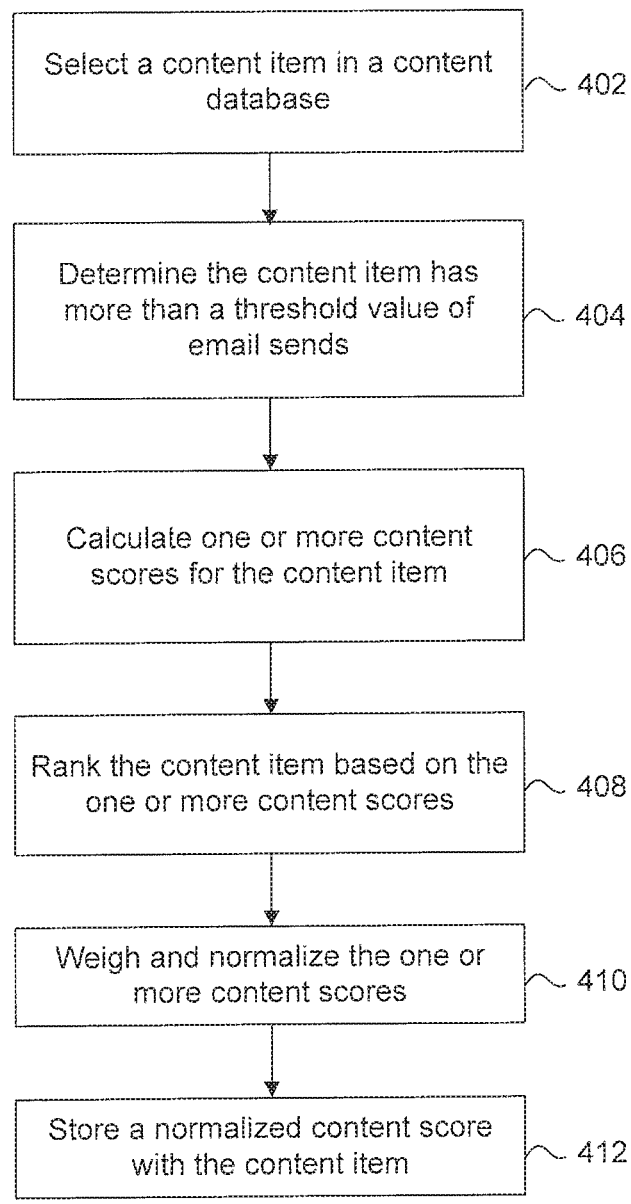
FIG. 4 is a flowchart illustrating a process for assigning a content score to a content item in a content database, according to some embodiments.

FIG. 4 is a flowchart for a method 400 for assigning a content score to a content item in a content database, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 1. However, method 400 is not limited to that example embodiment.

In 402, scoring engine 106 selects a content item in a content database. In some embodiments, a content item may be an offer item (e.g., a proposal to a customer to buy a product or service). The content item may be stored in a content database. As would be appreciated by a person of ordinary skill in the art, the content database may be a relational DBMS.

In 404, scoring engine 106 determines that the content item has more than a threshold number of email sends. For example, scoring engine 106 may determine that the content item in the content database has been sent more than 1000 times.

In 406, scoring engine 106 calculate one or more content scores for the content item based on various metrics. For example, in some embodiments, scoring engine 106 may calculate CTOR, click rate, open rate, and unsubscribe rate content scores for the content item. As would be appreciated by a person of ordinary skill in the art, scoring engine 106 may calculate various other types of content scores for the content item.

In 408, scoring engine 106 ranks the content item among the other content items based on one of its content score metrics. For example, in some embodiments, scoring engine 106 may compare the content score metric for the content item to a corresponding content score metric for a second content item. In some embodiments, based on the difference in content score metrics, scoring engine 106 may rerank the content item with respect to the second content item. In some embodiments, scoring engine 106 may only rank the content item and the second content item differently, incrementing one rank from high to low where the difference between their content score metrics is statistically significant. As would be appreciated by a person of ordinary skill in the art, scoring engine 106 may determine that there is a statistically significant difference based on calculating a Z score between the two content score metrics.

In some embodiments, scoring engine 106 may further rank the content item among the other content items based on a second one of its content score metrics. As would be appreciated by a person of ordinary skill in the art, scoring engine 106 may rank content item based on a hierarchy of best performing content score metrics.

In 410, scoring engine 106 weighs and normalizes the one or more content score metrics for the content item. For example, in some embodiments, scoring engine 106 may multiply the multiple content score metrics associated with the content item by different weights. For example, scoring engine 106 may multiple a CTOR content score metric by a first weight and a click content score metric by a second weight. Scoring engine 106 may then normalize the multiple weighted content score metrics for the content item. For example, in some embodiments, scoring engine 106 may sum the weighted content score metrics and normalize the resulting number so that it falls within a specific range.

In 412, scoring engine 106 may store the resulting normalized content score with the content item.

Figure 5:
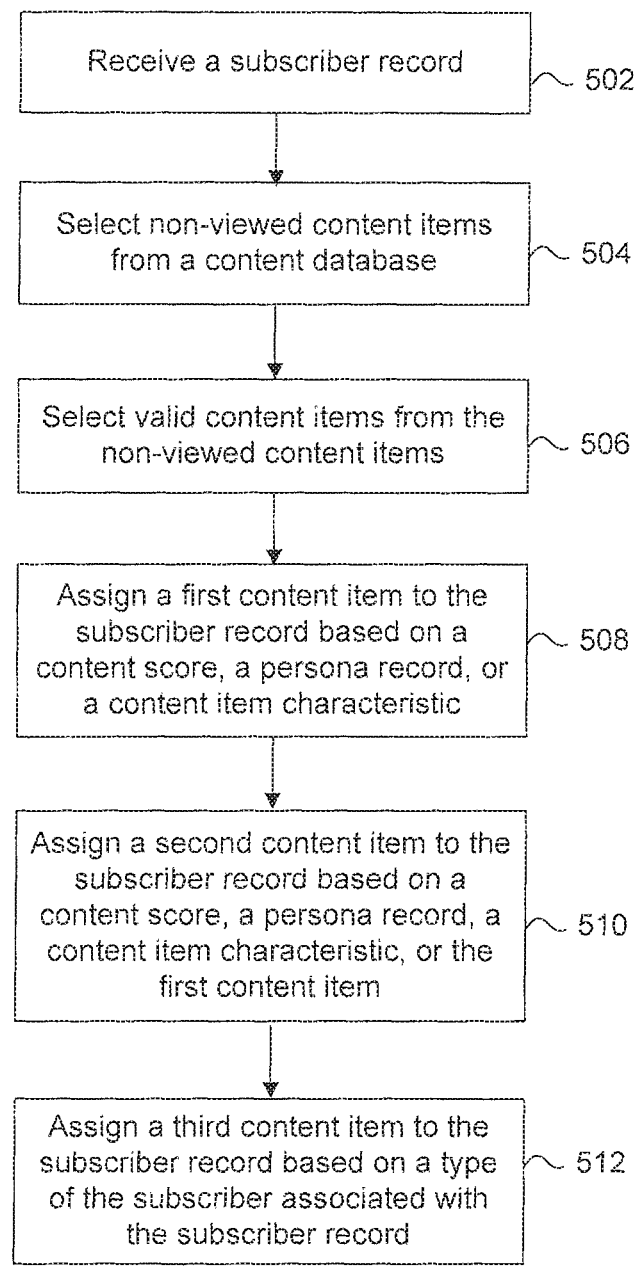
FIG. 5 is a flowchart illustrating a process for assigning a content item to a subscriber record, according to some embodiments.

FIG. 5 is a flowchart for a method 500 for assigning a content item to a subscriber record, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1 and 2. However, method 500 is not limited to that example embodiment.

In 502, content engine 108 receives a subscriber record for assignment of one or more content items from a content database.

In 504, content engine 108 selects non-viewed content items from the content database for possible assignment to the subscriber record. For example, in some embodiments, content engine 108 may store in the content pool only content items that the subscriber associated with the subscriber record has not viewed in a certain period of time (e.g., the last 90 days).

In 506, content engine 108 selects one or more valid content items from the non-viewed content items for possible assignment to the subscriber record. In some embodiments, content engine 108 may check an expiration date field of a content item to determine if the content item is valid (e.g., non-expired). In some embodiments, content engine 108 may store the non-viewed valid content items marked in a content pool for possible assignment to the subscriber record.

In 508, content engine 108 assigns a first content item to a subscriber record based on one or more of a content score associated with the content item, a persona record assigned to the subscriber record, and one or more characteristics of the content item. In some embodiments, content engine 108 assigns the first content item to a subscriber record using rules based content assignment engine 202 and or persona record based content assignment engine 204.

In 510, content engine 108 assigns a second content item to the subscriber record based on one or more of a content score associated with the content item, a persona record assigned to the subscriber record, and one or more characteristics of the content item. In some embodiments, affiliated content based content assignment engine 206 of content engine 108 may assign the second content item to the subscriber record.

In 512, content engine 108 assigns a third content item to the subscriber record based on the subscriber associated with the subscriber record being a customer. In some embodiments, content engine 108 may assign the third content item based on the third content item being tagged (e.g., as a third offer). In some embodiments, content engine 108 may perform this assignment randomly.

Figure 7:
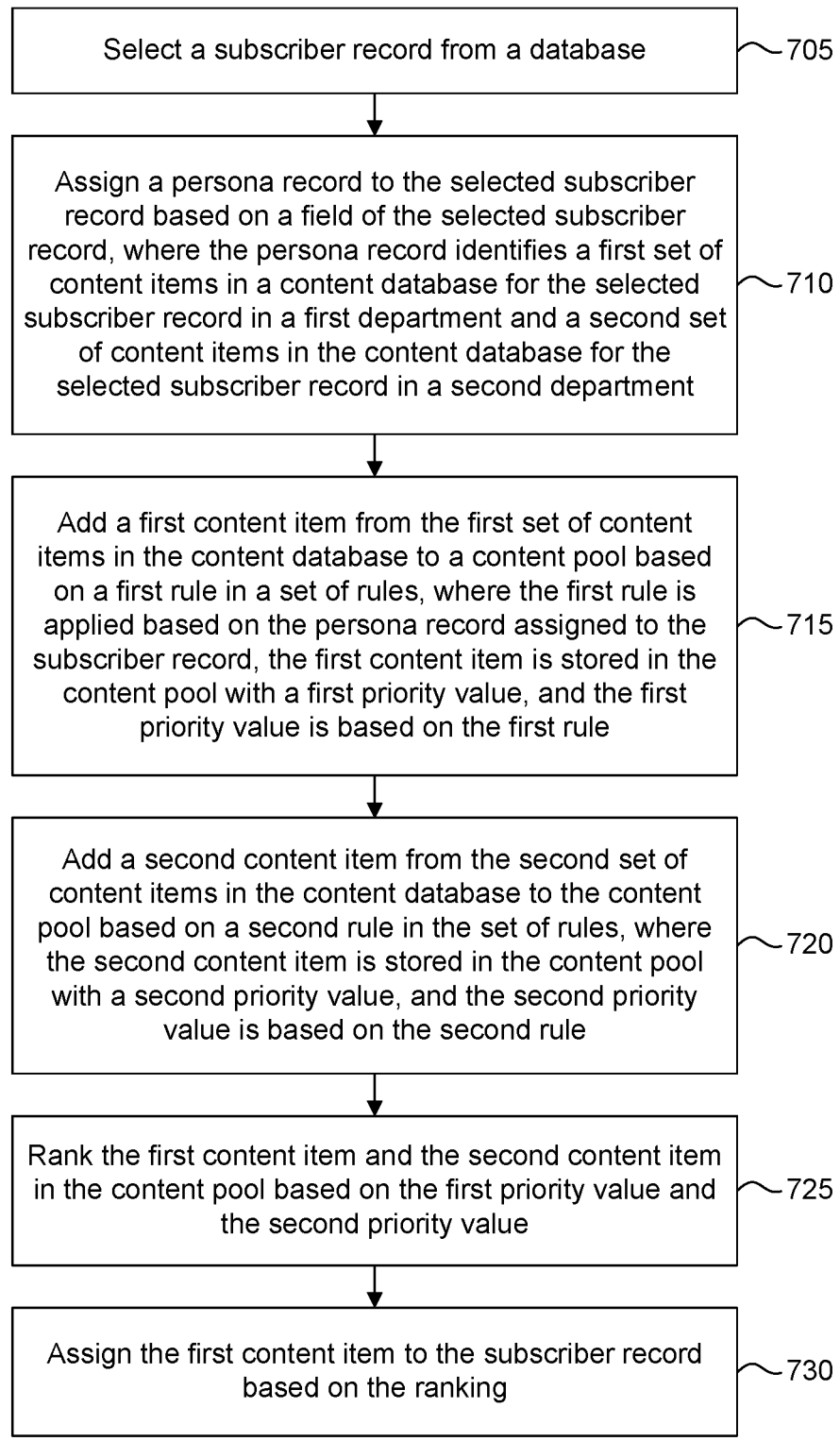
FIG. 7 is a flowchart illustrating a process for assigning a content item to a subscriber record, according to some embodiments.

FIG. 7 is a flowchart illustrating a process for assigning a content item to a subscriber record in accordance with one or more embodiments. In 705, a subscriber record is selected from a database. In 710, a persona record is assigned to the selected subscriber record based on a field of the selected subscriber record. The persona record identifies a first set of content items in a content database for the selected subscriber record in a first department and a second set of content items in the content database for the selected subscriber record in a second department. In 715, a first content item from the first set of content items in the content database is added to a content pool based on a first rule in a set of rules. The first rule is applied based on the persona record assigned to the subscriber record, the first content item is stored in the content pool with a first priority value, and the first priority value is based on the first rule. In 720, a second content item from the second set of content items in the content database is added to the content pool based on a second rule in the set of rules. The second content item is stored in the content pool with a second priority value, and the second priority value is based on the second rule. In Step 725, the first content item and the second content item in the content pool are ranked based on the first priority value and the second priority value. In 730, the first content item is assigned to the subscriber record based on the ranking.

Figure 6:
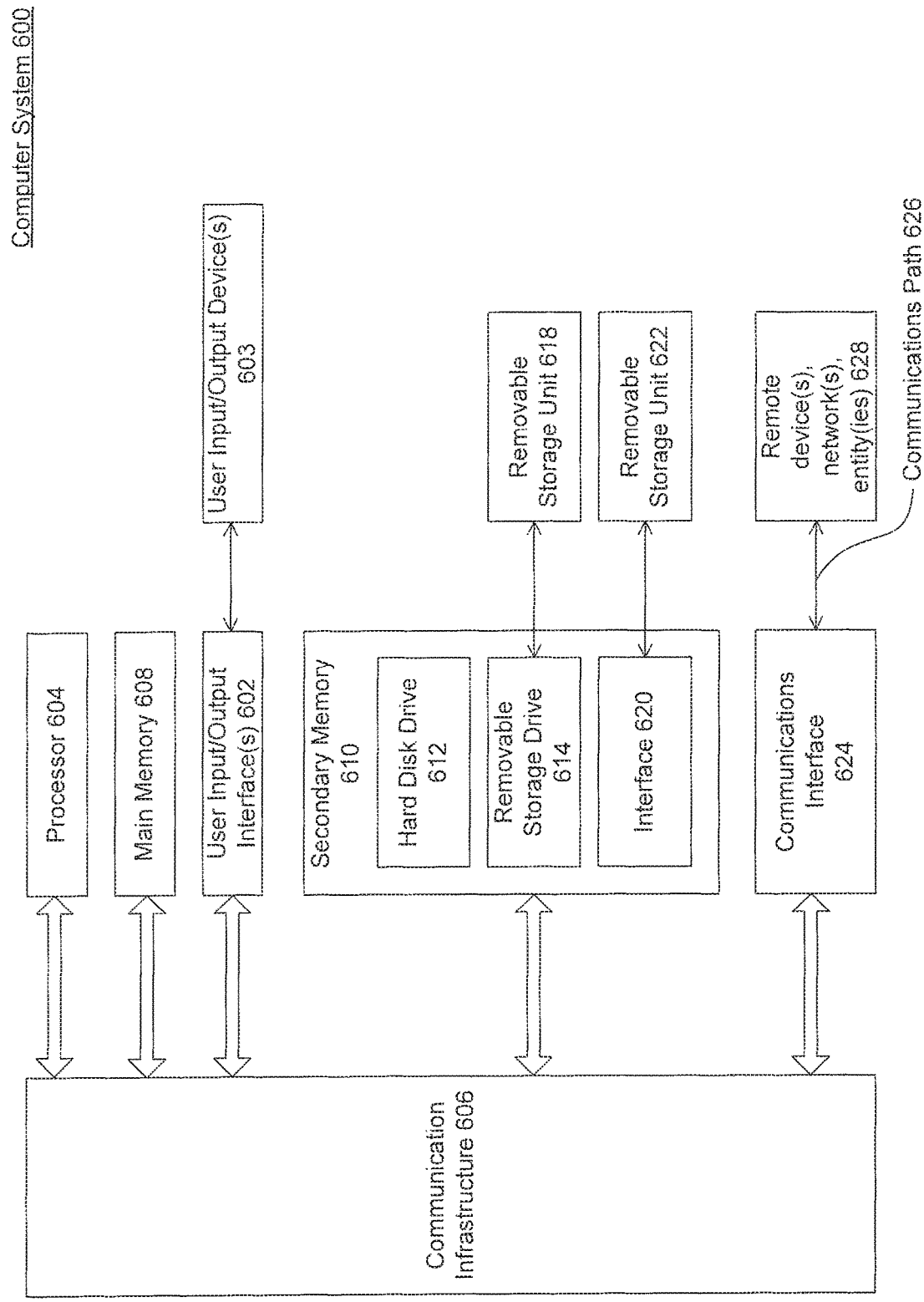
FIG. 6 is an example computer system useful for implementing various embodiments.

Various embodiments can be implemented, for example, using one or more computer systems, such as computer system 600 shown in FIG. 6. Computer system 600 can be used, for example, to implement method 500 of FIG. 5. For example, computer system 600 can perform content item assignment to a subscriber record. Computer system 600 can further perform persona record assignment to a subscriber record, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   selecting, by at least one processor, a subscriber record from a database;
   first assigning, by the at least one processor, a persona record to the selected subscriber record based on a field of the selected subscriber record, wherein the persona record identifies a first set of content items in a content database for the selected subscriber record in a first department and a second set of content items in the content database for the selected subscriber in a second department;
   adding, by the at least one processor, a first content item from the first set of content items in the content database to a content pool based on a first rule in a set of rules, wherein the first rule is applied based on the persona record assigned to the subscriber record, the first content item is stored in the content pool with a first priority value, and the first priority value is based on the first rule;

adding, by the at least one processor, a second content item from the second set of content items in the content database to the content pool based on a second rule in the set of rules, wherein the second content item is stored in the content pool with a second priority value, and the second priority value is based on the second rule;

ranking, by the at least one processor, the first content item and the second content item in the content pool based on the first priority value and the second priority value; and second assigning, by the at least one processor, the first content item to the subscriber record based on the ranking.

2. The method of claim 1, further comprising:
inserting the first content item into an electronic mail (email) based on the second assigning; and
sending the email to an email address associated with the subscriber record.

3. The method of claim 1, wherein the selecting is performed in response to a request to send an electronic mail (email) or based on a periodic interval.

4. The method of claim 1, wherein the ranking the first content item and the second content item further comprises:
ranking the first content item and the second content item in the content pool based on a first content score metric associated with the first content item and a second content score metric associated with the second content item.

5. The method of claim 4, wherein the first content score metric is based on a click to open rate, a click rate, an open rate, or an unsubscribe rate for the first content item.

6. The method of claim 1, further comprising:
adding a third content item to the content pool based on the assignment of the first content item to the subscriber record and a second set of rules.

7. The method of claim 6, further comprising:
adding a fourth content item to the content pool based on the assignment of the first content item to the subscriber record and the second set of rules;
ranking the third content item and the fourth content item in the content pool based on a third priority value associated with the third content item and a fourth priority value associated with the fourth content item; and
assigning the third content item to the subscriber record based on the ranking.

8. A system, comprising:
a memory; and
at least one processor coupled to the memory and configured to:
select a subscriber record from a database;
first assign a persona record to the selected subscriber record based on a field of the selected subscriber record, wherein the persona record identifies a first set of content items in a content database for the selected subscriber record in a first department and a second set of content items in the content database for the selected subscriber in a second department;
add a first content item from the first set of content items in the content database to a content pool based on a first rule in a set of rules, wherein the first rule is applied based on the persona record assigned to the subscriber record, the first content item is stored in the content pool with a first priority value, and the first priority value is based on the first rule;
add a second content item from the second set of content items in the content database to the content pool based on a second rule in the set of rules, wherein the second content item is stored in the content pool with a second priority value, and the second priority value is based on the second rule;
rank the first content item and the second content item in the content pool based on the first priority value and the second priority value; and
second assign the first content item to the subscriber record based on the ranking.

9. The system of claim 8, wherein the at least one processor is further configured to:
insert the first content item into an electronic mail (email) based on the second assigning; and
send the email to an email address associated with the subscriber record.

10. The system of claim 8, wherein the selecting is performed in response to a request to send an electronic mail (email) or based on a periodic interval.

11. The system of claim 8, wherein to rank the first content item and the second content item the at least one processor is further configured to:
rank the first content item and the second content item in the content pool based on a first content score metric associated with the first content item and a second content score metric associated with the second content item.

12. The system of claim 11, wherein the first content score metric is based on a click to open rate, a click rate, an open rate, or an unsubscribe rate for the first content item.

13. The system of claim 8, wherein the at least one processor is further configured to:
add a third content item to the content pool based on the assignment of the first content item to the subscriber record and a second set of rules.

14. The system of claim 13, wherein the at least one processor is further configured to:
add a fourth content item to the content pool based on the assignment of the first content item to the subscriber record and the second set of rules;
rank the third content item and the fourth content item in the content pool based on a third priority value associated with the third content item and a fourth priority value associated with the fourth content item; and
assign the third content item to the subscriber record based on the ranking.

15. A non-transitory computer-readable device having instructions stored thereon that, when executed by at least one computing device, causes the at least one computing device to perform operations comprising:
selecting a subscriber record from a database;
first assigning a persona record to the selected subscriber record based on a field of the selected subscriber record, wherein the persona record identifies a first set of content items in a content database for the selected subscriber record in a first department and a second set of content items in the content database for the selected subscriber in a second department;
adding a first content item from the first set of content items in the content database to a content pool based on a first rule in a set of rules, wherein the first rule is applied based on the persona record assigned to the subscriber record, the first content item is stored in the content pool with a first priority value, and the first priority value is based on the first rule;

adding a second content item from the second set of content items in the content database to the content pool based on a second rule in the set of rules, wherein the second content item is stored in the content pool with a second priority value, and the second priority value is based on the second rule;

ranking the first content item and the second content item in the content pool based on the first priority value and the second priority value; and second assigning the first content item to the subscriber record based on the ranking.

16. The non-transitory computer-readable device of claim 15, the operations further comprising:

inserting the first content item into an electronic mail (email) based on the second assigning; and sending the email to an email address associated with the subscriber record.

17. The non-transitory computer-readable device of claim 15, wherein the ranking the first content item and the second content item comprises:

ranking the first content item and the second content item in the content pool based on a first content score metric associated with the first content item and a second content score metric associated with the second content item.

18. The non-transitory computer-readable device of claim 17, wherein the first content score metric is based on a click to open rate, a click rate, an open rate, or an unsubscribe rate for the first content item.

19. The non-transitory computer-readable device of claim 15, the operations further comprising:

adding a third content item to the content pool based on the assignment of the first content item to the subscriber record and a second set of rules.

20. The non-transitory computer-readable device of claim 19, the operations further comprising:

adding a fourth content item to the content pool based on the assignment of the first content item to the subscriber record and the second set of rules;

ranking the third content item and the fourth content item in the content pool based on a third priority value associated with the third content item and a fourth priority value associated with the fourth content item; and assigning the third content item to the subscriber record based on the ranking.

* * * * *